US006531551B2

(12) United States Patent
Ohno et al.

(10) Patent No.: US 6,531,551 B2
(45) Date of Patent: *Mar. 11, 2003

(54) POLYPROPYLENE COMPOSITION, PROCESS FOR PREPARING THE SAME, AND POLYMERIZATION CATALYST THEREFOR

(75) Inventors: Katsuhiko Ohno, Chiba (JP); Masami Kimura, Chiba (JP); Taketo Hirose, Chiba (JP); Yoshitaka Morimoto, Chiba (JP); Jun Saito, Chiba (JP)

(73) Assignee: Chisso Corporation, Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/214,798

(22) PCT Filed: Aug. 6, 1997

(86) PCT No.: PCT/JP97/02753

§ 371 (c)(1),
(2), (4) Date: Jan. 11, 1999

(87) PCT Pub. No.: WO98/06781

PCT Pub. Date: Feb. 19, 1998

(65) Prior Publication Data

US 2001/0053831 A1 Dec. 20, 2001

(30) Foreign Application Priority Data

Aug. 9, 1996 (JP) .............................. 8-227582
Nov. 18, 1996 (JP) ............................ 8-322238

(51) Int. Cl.[7] ................. C08F 10/06; C08F 4/642
(52) U.S. Cl. ................. 526/124.7; 526/124.3; 526/348; 526/351; 502/109; 502/132
(58) Field of Search ................. 526/124.3, 124.7, 526/351, 348; 502/129, 109

(56) References Cited

U.S. PATENT DOCUMENTS

| 4,128,606 A | 12/1978 | Furutachi et al. | |
| 4,634,740 A | 1/1987 | Fujita et al. | |
| 4,645,808 A * | 2/1987 | Shiga et al. | 526/119 |
| 4,923,935 A | 5/1990 | Sano et al. | |
| 5,055,528 A * | 10/1991 | Kioka et al. | 525/270 |
| 5,229,476 A | 7/1993 | Hara et al. | |
| 5,252,529 A | 10/1993 | Ueda et al. | 502/113 |
| 5,260,384 A | 11/1993 | Morimoto et al. | 525/240 |
| 5,382,631 A | 1/1995 | Stehling et al. | 525/240 |
| 5,494,982 A | 2/1996 | Nakacho et al. | 526/65 |
| 5,629,254 A | 5/1997 | Fukuoka et al. | |
| 5,854,354 A | 12/1998 | Ueda et al. | |
| 6,004,897 A | 12/1999 | Imuta et al. | |
| 6,156,845 A * | 12/2000 | Satio et al. | 525/240 |

FOREIGN PATENT DOCUMENTS

| DE | 32 46 447 A1 | 7/1983 |
| EP | 315 481 A3 | 5/1989 |
| EP | 398 350 A2 | 11/1990 |
| EP | 0611780 A2 | 8/1992 |
| EP | 534 119 A2 | 3/1993 |
| EP | 0577321 A1 | 6/1993 |
| EP | 579 510 A2 | 1/1994 |
| EP | 856 526 A1 | 8/1998 |
| EP | 864 589 A2 | 9/1998 |
| JP | 52-136247 | 11/1977 |
| JP | 57-65738 | 4/1982 |
| JP | 3-50239 | 3/1991 |
| JP | 6-057055 | 3/1994 |
| JP | 7-330985 | 12/1995 |
| JP | 8-217928 | 8/1996 |
| JP | 10-17736 | 1/1998 |

OTHER PUBLICATIONS

A. Zambelli, et al., Model Compounds and C NMR Observation of Stereosequences of Polypropylene, pp. 687–9, Marcomolecules vol. 8, No. 5.

A. Zambelli, et al., Carbon–13 Observations of the Stereochemical Configuration of Polypropylene, pp. 925–6, Macromolecules vol. 6, No. 6.

Kaminsky, *Metallocene Catalysts*, Dec. 7–8–9, 1992.

* cited by examiner

*Primary Examiner*—Caixia Lu
(74) *Attorney, Agent, or Firm*—Merchant & Gould P.C.

(57) ABSTRACT

A polypropylene composition comprising 0.001 to 10 parts by weight of a polyethylene having an intrinsic viscosity [ηE] of 0.01 to less than 15 dl/g s measured in tetralin at 135° C. and 100 parts by weight of a polyolefin comprising at least polypropylene, wherein the polyethylene is finely dispersed as particles with a number average particle diameter of, e.g., 1 to 5000 nm in the polyolefin comprising at least polypropylene. By virtue of the above constitution, the polypropylene composition has excellent transparency and rigidity, is free from the creation of a sweeper roll flow mark in the preparation of a film and substantially free from a neck-in phenomenon of a film, and has high productivity.

8 Claims, 3 Drawing Sheets

POLYPROPYLENE COMPOSITION, PROCESS FOR PREPARING THE SAME, AND POLYMERIZATION CATALYST THEREFOR

TECHNICAL FIELD

The present invention relates to a polypropylene composition that provides excellent productivity for polypropylene film and from which a film having high transparency and high rigidity can be obtained, and a method for producing the same, and to processes for preparing a catalyst and a preactivated catalyst for polypropylene production used in the method. More particularly, the present invention relates to a polypropylene composition from which a non-oriented polypropylene film excellent in transparency and rigidity and having high productivity, in which little neck-in is caused and on which a sweeper roll mark is not easily formed in producing a thick polypropylene film having a thickness of 30 μm or more, can be produced, and to a method for producing the same, and to processes for preparing a catalyst and a preactivated catalyst for polypropylene production used in the method.

BACKGROUND OF THE INVENTION

Since crystalline polypropylene is excellent in mechanical properties, chemical resistance and the like, and is very useful with respect to cost effectiveness, it has been widely utilized in every molding field. In particular, it is excellent in optical properties, mechanical properties, packaging suitability and the like, and it has been widely used as packaging materials for food, fiber wrapping and the like.

However, when producing a polypropylene film at a high speed using a conventional polypropylene resin, there may be problems. First, neck-in, in which the width of the resin film molded with a T die narrows so much that the width of the film having uniform thickness is reduced, can occur. This is economically inefficient. Second, a spiral mark may be transferred onto the film due to the use of a sweeper roll to prevent a slipping agent such as fatty amide, which is generally added to a polypropylene resin, from being deposited on a chilled roll surface. As a result, optical properties of the film are lowered and the productivity is greatly reduced. Particularly in production of a thick non-oriented film, a sweeper roll mark may be transferred onto the film and causes irregular transparency in the optical property, so that the productivity of a film having high transparency is limited.

A method of copolymerizing α-olefins such as propylene, ethylene and butene-1 is generally carried out in order to improve transparency in a non-oriented polypropylene film. However, when producing a non-oriented film by melt extrusion with a T die using the random copolymer obtained, because the random copolymer is low in crystallization temperature and in crystallization rate, it is not solidified by the time it is contacted with a sweeper roll. As a result, a spiral mark is easily transferred onto the film due to the sweeper roll, so that a film having a desirable high and uniform transparency is difficult to obtain, especially in producing a thick film. In addition, because the non-oriented film obtained is low in rigidity, elongation or dimensional change may occur when conducting printing on the film at a high speed and the product value is reduced.

Methods of adding metallic salts such as aluminum carboxylate (Japanese Published Unexamined Patent Application (Tokukai) No. HEI 3-220208), or adding nucleating agents such as a sorbitol type derivative, organic phosphate and the like (Japanese Published Unexamined Patent Applications (Tokukai) No. SHO 51-22740 and No. SHO 58-225143, and the like) to a polypropylene resin are used in order to improve transparency and rigidity of the polypropylene resin. However, there are problems in any of these methods as follows: insufficient dispersion of a nucleating agent may cause a reduction in product quality, and in some cases an odor remains in the modified propylene obtained and the odor is transferred to packaging materials for food and reduces the food product value.

In order to solve this problem, use of nucleating agents made of polymer with a high melting point have been proposed (Japanese Published Unexamined Patent Applications (Tokukai) No. SHO 60-139710, No. SHO 62-1738 and No. HEI 1-156305, and the like). However, there were problems in these methods such as the high cost of the nucleating agents of polymer with high melting point used, or that sufficient properties were not always observed depending upon the use. Thus, improvements in these methods have been required.

Furthermore, a method comprising preliminarily polymerizing α-olefin having 2 or more carbon atoms in the presence of a catalyst comprising a titanium complex and an organic metal compound, and then polymerizing α-olefin having 3 or more carbon atoms (Japanese Published Examined Patent Application (Tokko) No. HEI 5-58003), a method of using a preactivated catalyst for α-olefin polymerization formed by allowing a catalyst comprising a titanium trichloride composition and an organic aluminum compound to react simultaneously with α-olefin and an electron donor (Japanese Published Unexamined Patent Application (Tokukai) No. SHO 61-64704), a method which comprises polymerizing olefin after preliminary polymerization of 0.01 to 1 g of olefin per a solid catalyst composition (Japanese Published Unexamined Patent Application (Tokukai) No. SHO 57-151602), and the like have been proposed to improve the transparency and rigidity of polypropylene resins. However, the preliminarily polymerized poly-α-olefin did not have a proper intrinsic viscosity [η] in any of these methods. Therefore, if a polypropylene film is produced by using a polypropylene resin obtained by such methods, the transparency and rigidity of the polypropylene film may be greatly reduced.

In the various compositions and the methods for producing the same which have been proposed as mentioned above, transparency and rigidity of polyolefin are improved to a certain degree. However, problems with regard to odor due to nucleating agents, crystallization rate, thermal stability and the like still remain to be solved. Particularly in production of thick films, detailed studies have not been carried out so as to provide all of high transparency, high rigidity and high productivity.

SUMMARY OF THE INVENTION

It is an object of the present invention to provide a polypropylene composition from which a polypropylene film excellent in transparency and rigidity and having high productivity can be obtained, a method for producing the same, and processes for preparing a catalyst and a preactivated catalyst for polypropylene production used in the method.

As a result of researches so as to accomplish the above-mentioned object, the inventors have completed this invention.

A polypropylene composition of the present invention comprises:

(a) 0.001 to 10 weight parts of polyethylene having an intrinsic viscosity [ηE] of at least 0.01 dl/g but less than 15 dl/g measured in tetralin at 135° C.; and (b) 100 weight parts of polyolefin comprising at least polypropylene; wherein (c) said polyethylene exists as dispersed fine particles in said polyolefin comprising at least polypropylene.

In the polypropylene composition of the present invention, it is preferable that the polyethylene exists as dispersed fine particles having a number average particle diameter of 1 to 5,000 nm.

In the polypropylene composition of the present invention, it is further preferable that the number average particle diameter of the polyethylene is 10 to 500 nm.

In the polypropylene composition of the present invention, it is preferable that the intrinsic viscosity [ηE] of the polypropylene composition measured in tetralin at 135° C. is 0.2 to 15 dl/g.

In the polypropylene composition of the present invention, it is preferable that the polyolefin comprising polypropylene is either a propylene homopolymer or an ethylene-propylene copolymer containing 0.05 to 3 weight % of ethylene.

In the polypropylene composition of the present invention, it is preferable that the density of the polyethylene (a) is 0.93 to 0.960 g/cm$^3$.

In the polypropylene composition of the present invention, it is preferable that the content of the polyethylene (a) is 0.004 to 10 weight parts. This range of composition is preferable when conducting the main polymerization of polypropylene after preliminary polymerization of polyethylene.

In the polypropylene composition of the present invention, it is preferable that the content of the polyethylene (a) is at least 0.001 weight parts but less than 0.05 weight parts, more preferably either at least 0.004 weight parts but less than 0.05 weight parts, or at least 0.05 weight parts but less than 10 weight parts. This range of the polyethylene composition is preferable for a composition wherein polypropylene is first polymerized and thereafter melt mixing with a separately-produced polyethylene is performed.

A method for producing a polypropylene composition according to the present invention comprises polymerizing 100 weight parts of olefin comprising at least propylene in the presence of 0.001 to 10 weight parts of a preactivated catalyst comprising: a catalyst for polyolefin production comprising a transition metal compound catalyst composition containing at least a titanium compound, 0.01 to 1,000 mol of an organic metal compound (AL1) of a metal selected from the group consisting of metals that belong to group I, group II, group XII and group XIII of the periodic table published in 1991 per 1 mole of the transition metal atom, and 0 to 500 mol of an electron donor (E1) per 1 mol of the transition metal atom; and 0.01 to 5,000 g of polyethylene (A) having an intrinsic viscosity [ηA] of at least 0.01 dl/g but less than 15 dl/g measured in tetralin at 135° C. per 1 g of the transition metal compound catalyst composition, and allowing the polyethylene to be finely dispersed as particles in the polyolefin composition.

In the method for producing a polypropylene composition according to the present invention, it is preferable that the polyethylene exists as dispersed fine particles having a number average particle diameter of 1 to 5,000 nm.

In the method for producing a polypropylene composition according to the present invention, it is further preferable that the number average particle diameter of the polyethylene is 10 to 500 nm.

In the method for producing a polypropylene composition according to the present invention, it is preferable that the intrinsic viscosity [ηE] of the polypropylene composition measured in tetralin at 135° C. is 0.2 to 15 dl/g.

In the method for producing a polypropylene composition according to the present invention, it is preferable that the polyolefin comprising polypropylene is either a propylene homopolymer or an ethylene-propylene copolymer containing 0.05 to 3 weight % of ethylene.

In the method for producing a polypropylene composition according to the present invention, it is preferable that the density of the polyethylene (a) is 0.93 to 0.960 g/cm$^3$.

A process for preparing a preactivated catalyst for olefin polymerization according to the present invention comprises polymerizing olefin in the presence of a catalyst for polyolefin production comprising a transition metal compound catalyst composition containing at least a titanium compound, 0.01 to 1,000 mole of an organic metal compound (AL1) of a metal selected from the group consisting of metals that belong to group I (e.g. Li and Na), group II (e.g. Mg), group XII (e.g. Zn) and group XIII (e.g. Al) of the periodic table published in 1991 per 1 mole of the transition metal atom, and 0 to 500 mole of an electron donor (E1) per 1 mole of the transition metal atom to preliminarily activate the catalyst and form 0.01 to 5,000 g of polyethylene (A) having an intrinsic viscosity [ηA] of at least 0.01 dl/g but less than 15 dl/g measured in tetralin at 135° C. per 1 g of the transition metal compound catalyst composition, wherein the polyethylene (A) is supported by the transition metal compound catalyst composition.

A catalyst for the main olefin polymerization according to the present invention comprises: a preactivated catalyst for olefin polymerization obtained by a method comprising polymerizing olefin in the presence of a catalyst for polyolefin production comprising a transition metal compound catalyst composition containing at least a titanium compound, 0.01 to 1,000 mole of an organic metal compound (AL1) of a metal selected from the group consisting of metals that belong to group I, group II, group XII and group XIII of the periodic table published in 1991 per 1 mole of the transition metal atom, and 0 to 500 mole of an electron donor (E1) per 1 mole of the transition metal atom to preliminarily activate the catalyst and form 0.01 to 5,000 g of polyethylene (A) having an intrinsic viscosity [ηA] of at least 0.01 dl/g but less than 15 dl/g measured in tetralin at 135° C. per 1 g of the transition metal compound catalyst composition, wherein the polyethylene (A) is supported by the transition metal compound catalyst composition; an organic metal compound (AL2) of a metal selected from the group consisting of metals that belong to group I, group II, group XII and group XIII of the periodic table published in 1991, the total amount of the organic metal compound (AL2) combined with the organic metal compound (AL1) contained in the preactivated catalyst being 0.05 to 5,000 mole per 1 mole of the transition metal atom in the preactivated catalyst; and an electron donor (E2), the total amount of the electron donor (E2) combined with the electron donor (E1) contained in the preactivated catalyst being 0 to 3,000 mole per 1 mole of the transition metal atom in the preactivated catalyst.

A method for producing a polyolefin composition according to the present invention comprises producing polypropylene having an intrinsic viscosity [ηP] of at least 0.01 dl/g but less than 15 dl/g measured in tetralin at 135° C. in the presence of said catalyst for main olefin polymerization.

A method for producing a polypropylene composition according to the present invention comprises producing polypropylene in the presence of a preactivated catalyst comprising: a catalyst for polyolefin production comprising a transition metal compound catalyst composition containing at least a titanium compound, 0.01 to 1,000 mole of an organic metal compound (AL1) of a metal selected from the group consisting of metals that belong to group I, group II, group XII and group XIII of the periodic table published in 1991 per 1 mole of the transition metal atom, and 0 to 500 mole of an electron donor (E1) per 1 mole of the transition metal atom; and 0.01 to 5,000 g of polypropylene having an intrinsic viscosity [ηA] of at least 0.01 dl/g but less than 15 dl/g measured in tetralin at 135° C. per 1 g of the transition metal compound catalyst composition, and performing melt mixing of the polypropylene with polyethylene.

In the above-mentioned method for producing a polypropylene composition, it is preferable to use a preactivated catalyst for olefin polymerization obtained by a process comprising polymerizing olefin in the presence of a catalyst for polyolefin production comprising a transition metal compound catalyst composition containing at least a titanium compound, 0.01 to 1,000 mole of an organic metal compound (AL1) of a metal selected from the group consisting of metals that belong to group I, group II, group XII and group XIII of the periodic table published in 1991 per 1 mole of the transition metal atom, and 0 to 500 mole of an electron donor (E1) per 1 mole of the transition metal atom to preliminarily activate the catalyst and form 0.01 to 5,000 g of polypropylene having an intrinsic viscosity [77 A] of at least 0.01 dl/g but less than 15 dl/g measured in tetralin at 135° C. per 1 g of the transition metal compound catalyst composition, in which the polypropylene is supported by the transition metal compound catalyst composition.

Another method for producing a polyolefin composition according to the present invention comprises producing polypropylene having an intrinsic viscosity [ηP] of at least 0.01 dl/g but less than 15 dl/g measured in tetralin at 135° C. in the presence of a catalyst for main olefin polymerization comprising: a preactivated catalyst for olefin polymerization obtained by a process comprising polymerizing olefin in the presence of a catalyst for polyolefin production comprising a transition metal compound catalyst composition containing at least a titanium compound, 0.01 to 1,000 mole of an organic metal compound (AL1) of a metal selected from the group consisting of metals that belong to group I, group II, group XII and group XIII of the periodic table published in 1991 per 1 mole of the transition metal atom, and 0 to 500 mole of an electron donor (E1) per 1 mole of the transition metal atom to preliminarily activate the catalyst and form 0.01 to 5,000 g of polypropylene having an intrinsic viscosity [ηA] of at least 0.01 dl/g but less than 15 dl/g measured in tetralin at 135° C. per 1 g of the transition metal compound catalyst composition, wherein the polypropylene is supported by the transition metal compound catalyst composition; an organic metal compound (AL2) of a metal selected from the group consisting of metals that belong to group I, group II, group XII and group XIII of the periodic table published in 1991, the total amount of the organic metal compound (AL2) combined with the organic metal compound (AL1) contained in the preactivated catalyst being 0.05 to 5,000 mole per 1 mole of the transition metal atom in the preactivated catalyst; and an electron donor (E2), the total amount of the electron donor (E2) combined with the electron donor (E1) contained in the preactivated catalyst being 0 to 3,000 mole per 1 mole of the transition metal atom in the preactivated catalyst; and then performing melt mixing of the polypropylene with polyethylene.

PREFERRED EMBODIMENTS OF THE INVENTION

In the specification, the term "polypropylene" refers to propylene homopolymer, and propylene-olefin random copolymer or propylene-olefin block copolymer containing 50 wt % or more of the propylene polymerization unit. The term "polyethylene" refers to ethylene homopolymer and ethylene-olefin random copolymer containing 50 wt % or more of the ethylene polymerization unit. The term "polymerization" refers to homopolymerization and copolymerization.

The present invention will be described in detail as follows:

The polyethylene (a) used in the polypropylene composition of the present invention has an intrinsic viscosity [ηE] of at least 0.01 dl/g but less than 15 dl/g measured in tetralin at 135° C., and is either an ethylene homopolymer or an ethylene-olefin random copolymer containing 50 wt % or more of the ethylene polymerization unit, preferably either an ethylene homopolymer or an ethylene-olefin random copolymer containing 70 wt % or more of the ethylene polymerization unit, more preferably either an ethylene homopolymer or an ethylene-olefin random copolymer containing 90 wt % or more of the ethylene polymerization unit. These polymers may be used either alone or in combinations of two or more.

In order to obtain a film excellent in transparency, the polyethylene (a) should have an intrinsic viscosity [ηE] of at least 0.01 dl/g but less than 15 dl/g, preferably 0.05 to 10 dl/g, more preferably 0.1 to 8 dl/g. If the intrinsic viscosity [ηE] of the polyethylene (a) is not within the above-mentioned range, neck-in is caused and a sweeper roll mark is formed during the production of a polypropylene film, so that the productivity of the film is greatly reduced.

Furthermore, it is preferable that the polyethylene (a) contains 50 wt % or more, preferably 80 wt % or more, more preferably 90 wt % or more of the ethylene polymerization unit in order to obtain a film excellent in transparency and rigidity.

The olefins other than ethylene that are copolymerized with ethylene and further comprise the polyethylene (a) are not particularly limited, but it is preferable to use olefins having 3 to 12 carbon atoms. Examples include propylene, 1-butene, 1-pentene, 1-hexene, 1-octene, 1-decene, 4-methyl-1-pentene, 3-methyl-1-pentene and the like. These olefins may be used either alone or in combination.

In the polypropylene composition of the present invention, further preliminary activation treatment using other α-olefins such as propylene, butene, or pentene is not restricted and may be performed, as long as the polypropylene composition contains 0.01 to 5 weight parts of the polyethylene (A), which is contained at a rate of 0.01 to 5,000 g per 1 g of the transition metal compound catalyst composition and has an intrinsic viscosity [ηA] of at least 0.01 dl/g but less than 15 dl/g measured in tetralin at 135° C. In this case, the order of the preliminary activation is not particularly limited.

The density of the polyethylene (a) is not particularly limited. The polyethylene preferably has a density of approximately 880 to 980 g/l. The polypropylene (b) of the polypropylene composition of the present invention has an intrinsic viscosity [ηP] of 0.2 to 10 dl/g measured in tetralin at 135° C., and is either a propylene homopolymer, a propylene-olefin random copolymer, or a propylene-olefin block copolymer containing 50 wt % or more of the propylene polymerization unit, preferably either a propylene homopolymer or a propylene-olefin random copolymer containing 90 wt % or more of the propylene polymerization unit. These polymers may be used either alone or in combinations of two or more.

Polypropylene having an intrinsic viscosity [ηP] of 0.2 to 10 dl/g, preferably 0.5 to 8 dl/g is used as the polypropylene (b) in order to improve the productivity of a film.

The olefins other than propylene that are copolymerized with propylene and further comprise the polypropylene (b) are not particularly limited, but it is preferable to use olefins having 2 to 12 carbon atoms. Examples include ethylene, 1-butene, 1-pentene, 1-hexene, 1-octene, 1-decene, 4-methyl-1-pentene, 3-methyl-1-pentene and the like. These olefins may be used either alone or in combinations of two or more.

The stereoregularity of the polypropylene (b) is not particularly limited, and any crystalline polypropylene that achieves the object of the present invention can be used. However, for example, polypropylene having crystallinity of 0.80 to 0.99, preferably 0.85 to 0.99, more preferably 0.90 to 0.99 with regard to isotactic pentad tacticity (mmmm) measured with $^{13}$C-NMR (nuclear magnetic resonance spectrum) is suitably used.

The term "isotactic pentad tacticity" (mmmm) herein refers to isotactic tacticity in a pentad unit in a polypropylene molecular chain, measured by means of $^{13}$C-NMR, which was proposed by A. Zambelli et al. (Macromolecules 6,925 (1973)). The assignment of the peak in the measuring spectrum is determined according to the method of assignment determination proposed by A. Zambelli et al (Macromolecules 8,687 (1975)). In this method, the assignment is determined by using a mixed solution containing 20 wt % of polymer and comprising o-dichlorobenzene and brombenzene-d5 in a ratio of 8:2 by weight, and measuring under conditions of 67.20 MHz at 130° C. For example, a JEOL-GX270NMR made by JEOL, Ltd. is used as the measuring device.

The polypropylene composition of the present invention comprises 0.001 to 5 weight parts, preferably 0.004 to 3 weight parts, particularly preferably 0.01 to 2 weight parts of the polyethylene (a) as mentioned above, and 100 weight parts of the polypropylene (b) so that a film excellent in transparency and rigidity can be obtained and the polypropylene composition can be produced with good productivity.

If the content of the polyethylene (a) is too small, a film excellent in transparency and rigidity cannot be obtained. If the polypropylene composition does not contain the polyethylene (a), powdery polypropylene of aggregated fine particles is produced during the production of the polypropylene composition, so that the productivity is reduced. When a polypropylene film is produced from such polypropylene compositions, neck-in may be caused and a sweeper roll mark is easily formed, and the productivity is greatly reduced.

On the other hand, if the content of the polyethylene (a) is too large, a film excellent in transparency cannot be obtained.

Although the polypropylene composition of the present invention can be produced by any method as long as the above-mentioned range is satisfied, it can be easily produced by a method comprising performing main polymerization of propylene or propylene and other olefins in the presence of a catalyst preliminarily activated with ethylene or ethylene and other olefins as specified below.

Although the polypropylene composition of the present invention can be produced by any method as long as the above-mentioned range is satisfied, it can be easily produced by a method comprising polymerizing propylene or propylene and other olefins in the presence of a catalyst preliminarily activated with propylene or propylene and other olefins as specified below to produce a powdery composition comprising polypropylene (a) and (b), and mixing the powdery composition with polyethylene (c).

In this specification, the term "preliminary activation" refers to activating the polymerization activity of a catalyst for polyolefin production prior to the main polymerization of propylene or propylene and other olefins. It is performed by polymerizing ethylene or ethylene and other olefins in the presence of a catalyst for polyolefin production and making the catalyst support the polymerized olefin.

The preactivated catalyst used in producing the polypropylene composition of the present invention comprises a catalyst for polyolefin production comprising: a transition metal compound catalyst composition containing at least a titanium compound, 0.01 to 1,000 mole of an organic metal compound (AL1) of a metal selected from the group consisting of metals that belong to Group I, Group II, Group XII, and Group XIII of the periodic table published in 1991 per 1 mole of the transition metal atom, and 0 to 500 mole of an electron donor (E1) per 1 mole of the transition metal atom; and approximately 0.01 to 5,000 of polyethylene (A) having an intrinsic viscosity [ηA] of at least 0.01 dl/g but less than 15 dl/g measured in tetralin at 135° C. per 1 g of the transition metal compound catalyst composition, which is supported by the catalyst for polyolefin production.

In the preactivated catalyst, any known catalytic composition mainly comprising a transition metal compound composition containing at least a titanium compound that has been proposed for producing polyolefin can be used as the transition metal compound catalyst composition. Particularly, a titanium-containing solid catalytic composition is preferably used for ease of manufacture.

For example, titanium-containing solid catalytic compositions containing a titanium trichloride composition as a main component (Japanese Published Examined Patent Applications (Tokko) No. SHO 56-3356, No. SHO 59-28573, No. SHO 63-66323 and the like), supported titanium-containing catalytic compositions containing titanium, magnesium, halogen and electron donor as essential components where a magnesium compound supports titanium tetrachloride (Japanese Published Unexamined Patent Applications (Tokukai) No. SHO 62-104810, No.

SHO 62-104811, No. SHO 62-104812, No. SHO 57-63310, No. SHO 57-63311, No. SHO 58-83006, No. SHO 58-138712 and the like) have been proposed, and any of these can be used as the titanium-containing solid catalytic composition.

The organic metal compound (AL1) can be a compound having an organic group of a metal selected from the group consisting of metals that belong to Group I, Group II, Group XII, and Group XIII of the periodic table published in 1991. Examples include organic lithium compounds, organic sodium compounds, organic magnesium compounds, organic zinc compounds and organic aluminum compounds. The organic metal compound can be used in combination with the above-mentioned transition metal compound catalytic composition. From among the examples, it is preferable to use an organic aluminum compound represented by the following formula:

$$AlR^1_p R^2_q X_{(3-(p+q))}$$

wherein $R^1$ and $R^2$ are independently selected from hydrocarbon groups such as alkyl group, cycloalkyl group and aryl group, and an alkoxy group; X represents a halogen atom; and p and q are positive integers satisfying a formula $0<p+q\leq3$.

Examples of organic aluminum compounds include trialkyl aluminums such as trimethyl aluminum, triethyl aluminum, tri-n-propyl aluminum, tri-n-butyl aluminum, tri-i-butyl aluminum, tri-n-hexyl aluminum, tri-i-hexyl aluminum or tri-n-octyl aluminum; dialkyl aluminum monohalides such as diethyl aluminum chloride, di-n-propyl aluminum chloride, di-i-butyl aluminum chloride, diethyl aluminum bromide or diethyl aluminum iodide; dialkyl aluminum hydrides such as diethyl aluminum hydride; alkyl aluminum sesquihalide such as ethyl aluminum sesquichloride; monoalkyl aluminum dihalide such as ethyl aluminum dichloride; and alkoxyalkyl aluminum such as diethoxy monoethyl aluminum, preferably trialkyl aluminum or dialkyl aluminum monohalide. Those organic aluminum compounds can be used either alone or in combination.

The electron donor (E1) is, if required, used to control formation rate and/or stereoregularity of polyolefin.

Examples of the electron donor (E1) include organic compounds having any of oxygen, nitrogen, sulfur and phosphorus in the molecule, such as ethers, alcohols, esters, aldehydes, fatty acids, ketones, nitrites, amines, amides, urea or thioureas, isocyanates, azo-compounds, phosphines, phosphites, hydrogen sulfide, thioethers or neoalcohols; silanols; and organic silicon compounds containing an Si—O—C bond in the molecule.

Examples of ethers include dimethyl ether, diethyl ether, di-n-propyl ether, di-n-butyl ether, di-i-amyl ether, di-n-pentyl ether, di-n-hexyl ether, di-i-hexyl ether, di-n-octyl ether, di-i-octyl ether, di-n-dodecyl ether, diphenyl ether, ethylene glycol monoethyl ether, diethylene glycol dimethyl ether, tetrahydrofuran and the like. Examples of alcohols include methanol, ethanol, propanol, butanol, pentanol, hexanol, octanol, 2-ethyl hexanol, allyl alcohol, benzyl alcohol, ethylene glycol, glycerin and the like. Examples of phenols include phenol, cresol, xylenol, ethyl phenol, naphthol and the like.

Examples of esters include monocarboxylic acid esters such as methyl methacrylate, methyl formate, methyl acetate, methyl butyrate, ethyl acetate, vinyl acetate, propyl-n-acetate, propyl-i-acetate, butyl formate, amyl acetate, butyl-n-acetate, octyl acetate, phenyl acetate, ethyl propionate, methyl benzoate, ethyl benzoate, propyl benzoate, butyl benzoate, octyl benzoate, 2-ethylhexyl benzoate, toluic acid methyl ester, toluic acid ethyl ester, anisic acid methyl ester, anisic acid ethyl ester, anisic acid propyl ester, anisic acid phenyl ester, ethyl cinnamate, naphthoic acid methyl ester, naphthoic acid ethyl ester, naphthoic acid propyl ester, naphthoic acid butyl ester, 2-ethylhexyl naphthoic acid, or ethyl phenylacetate; aliphatic polycarboxylic acid esters such as diethyl succinate, methylmalonic acid diethyl ester, butylmalonic acid diethyl ester, dibutyl maleate or diethyl butylmaleic acid; and aromatic polycarboxylic acid esters such as monomethyl phthalate, dimethyl phthalate, diethyl phthalate, di-n-propyl phthalate, mono-n-butyl phthalate, di-n-butyl phthalate, diisobutyl phthalate, di-n-heptyl phthalate, di-2-ethylhexyl phthalate, di-n-octyl phthalate, diethyl isophthalate, dipropyl isophthalate, dibutyl isophthalate, di-2-ethylhexyl isophthalate, diethyl terephthalate, dipropyl terephthalate, dibutyl terephthalate or naphthalenedicarboxylic acid diisobutyl ester.

Examples of aldehydes include acetaldehyde, propionaldehyde and benzaldehyde. Examples of carboxylic acids include monocarboxylic acids such as formic acid, acetic acid, propionic acid, butyric acid, oxalic acid, succinic acid, acrylic acid, maleic acid, valeric acid or benzoic acid; and acid anhydrides such as benzoic anhydride, phthalic anhydride or tetrahydrophthalic anhydride. Examples of ketones include acetone, methylethyl ketone, methylisobutyl ketone and benzophenone.

Examples of nitrogen-containing compounds include nitriles such as acetonitrile or benzonitrile; amines such as methyl amine, diethyl amine, tributyl amine, triethanol amine, β-(N,N-dimethylamino)ethanol, pyridine, quinoline, α-picoline, 2,4,6-trimethyl pyridine, 2,2,5,6-tetramethyl piperidine, 2,2,5,5-tetramethyl pyrrolidine, N,N,N',N'-tetramethyl ethylenediamine, aniline or dimethyl aniline; amides such as formamide, hexamethyl phosphoric acid triamide, N,N,N',N',N"-pentamethyl-N'-β-dimethylaminomethyl phosphoric acid triamide or octamethyl pyrophosphoryl amide; ureas such as N,N,N',N'-tetramethyl urea; isocyanates such as phenyl isocyanate or toluyl isocyanate; azo compounds such as azobenzene.

Examples of the phosphorus containing compounds include phosphines such as ethyl phosphine, triethyl phosphine, di-n-octyl phosphine, tri-n-octyl phosphine, triphenyl phosphine or triphenyl phosphine oxide; phosphites such as dimethyl phosphite, di-n-octyl phosphite, triethyl phosphite, tri-n-butyl phosphite or triphenyl phosphite.

Examples of the sulfur containing compounds include thioethers such as diethyl thioether, diphenyl thioether or methyl phenyl thioether; and thioalcohols such as ethyl thioalcohol, n-propyl thioalcohol or thiophenol.

Examples of the organic silicon compounds include silanols such as trimethyl silanol, triethyl silanol or triphenyl silanol; and organic silicon compounds having a Si—O—C bond, such as trimethylmethoxysilane, dimethyldimethoxysilane, methylphenyldimethoxysilane, diphenyldimethoxysilane, methyltrimethoxysilane, vinyltrimethoxysilane, phenyltrimethoxysilane, trimethylethoxysilane, dimethyldiethoxysilane, diisopropyldimethoxysilane, diisobutyldimethoxysilane, diphenyldiethoxysilane, methyltriethoxysilane, ethyltriethoxysilane, vinyltriethoxysilane, butyltriethoxysilane, phenyltriethoxysilane, ethyltriisopropoxysilane, vinyltriacetoxysilane, cyclopentylmethyldimethoxysilane, cyclopentyltrimethoxysilane, dicyclopentyldimethoxysilane, cyclohexylmethyldimethoxysilane, cyclohexyltrimethoxysilane, dicyclohexyldimethoxysilane or 2-norbornylmethyldimethoxysilane.

The above electron donors can be used either alone or in combination.

In the preactivated catalyst, the polyethylene (A) is either an ethylene homopolymer or a copolymer of ethylene and olefins having 3 to 12 carbon atoms containing 50 wt % or more, preferably 70 wt % or more, more preferably 90 wt % or more of the ethylene polymerization unit, which has an intrinsic viscosity [ηA] of at least 0.01 dl/g but less than 15 dl/g, preferably 0.1 to 10 dl/g, more preferably 0.1 to 8 dl/g measured in tetralin at 135° C. The polyethylene (A) eventually constitutes the polyethylene (a) in the polypropylene composition of the present invention. Accordingly, the intrinsic viscosity [ηE] of the polyethylene (a) and the intrinsic viscosity [ηA] of the polyethylene (A) have a relationship of [ηE]=[ηA].

The amount of the polyethylene (A) to be supported by the catalyst is 0.01 to 5,000 g, preferably 0.05 to 2,000 g, more preferably 0.1 to 1,000 g per 1 g of the transition metal compound catalyst composition, so that a film having excellent transparency and rigidity can be obtained and a polypropylene composition can be produced with good productivity.

In the present invention, the preactivated catalyst is prepared by a preliminary activation treatment comprising polymerizing ethylene or ethylene and other olefins in the presence of a catalyst for polyolefin production comprising the above-mentioned transition metal compound catalyst composition containing at least a titanium compound, an organic metal compound (AL1) and, if required, an electron donor (E1) to preliminarily activate the catalyst and form the polyethylene (A), which is supported by the transition metal compound catalyst composition.

The catalyst for polyolefin production used in the preliminary activation treatment comprises a transition metal compound catalyst composition containing a titanium compound, and 0.01 to 1,000 mole, preferably 0.05 to 500 mole of an organic metal compound (AL1) per 1 mole of the transition metal in the catalyst composition, and 0 to 500 mole, preferably 0 to 100 mole of an electron donor (E1) per 1 mole of the transition metal in the catalyst composition.

In the catalyst for polyolefin production, the polyethylene (A) covers the transition metal compound catalyst composition and is supported by the catalyst composition by the process of: supplying 0.01 to 10,000 g of ethylene or a mixture of ethylene and other olefins in a solvent and polymerizing in the presence of 0.001 to 5,000 millimole, preferably 0.01 to 1,000 millimole, of the catalyst for polyolefin production per 1 liter of polymerization volume of ethylene or ethylene and other olefins, expressed in terms of the amount of transition metal atom in the catalyst composition, to preliminarily activate the catalyst and form 0.01 to 5,000 g of polyethylene per 1 g of the transition metal compound catalyst composition.

The term "polymerization volume" refers to a volume of the liquid phase portion in a polymerization reactor with regard to liquid phase polymerization, and to a volume of the gas phase portion in a polymerization reactor with regard to gas phase polymerization.

The amount of the transition metal compound catalyst composition used is preferably within the above-mentioned range so as to maintain an efficient and controlled reaction rate of the propylene polymerization. Furthermore, if the amount of the organic metal compound (AL1) used is too small, the polymerization reaction rate is inappropriately slowed down. On the other hand, if the amount of the organic metal compound used is too large, the polymerization reaction rate does not sufficiently increase, and in addition the polypropylene composition obtained as a final product is likely to contain much residue of the organic metal compound (AL1). Furthermore, if the amount of the electron donor (E1) used is too large, the polymerization reaction rate is reduced. If the amount of the solvent used is too large, a large reactor is required and in addition it is difficult to control and maintain the polymerization reaction rate efficiently.

The preliminary activation treatment can be performed in the liquid phase using solvents. Examples of the solvents include aliphatic hydrocarbons such as butane, pentane, hexane, heptane, octane, isooctane, decane or dodecane; alicyclic hydrocarbons such as cyclopentane, cyclohexane or methyl cyclohexane; aromatic hydrocarbons such as toluene, xylene or ethylbenzene; inert solvents such as gasoline fraction or hydrogenized diesel oil fraction; and olefins. Furthermore, the preliminary activation treatment can also be performed in the gas phase without using a solvent.

The preliminary activation treatment may be performed in the presence of hydrogen.

The conditions of the polymerization of ethylene or a mixture of ethylene and other olefins for preliminary activation of the catalyst are not particularly restricted as long as the polyethylene (A) is produced in an amount of 0.01 to 5,000 g, preferably 0.05 to 2,000 g, further preferably 0.1 to 1,000 g per 1 g of the transition metal compound catalyst composition, and it is usually performed at a relatively low temperature of approximately −40 to 40° C., preferably −20 to 30° C., further preferably 0 to 20° C., at a pressure of 0.1 to 5 MPa, preferably 0.2 to 5 MPa, more preferably 0.3 to 5 MPa, for 1 minute to 24 hours, preferably 5 minutes to 18 hours, more preferably 10 minutes to 12 hours.

To provide the intended polypropylene composition, the preactivated catalyst can be used as a catalyst for main polymerization of olefins having 2 to 12 carbon atoms, either alone or in combination with additionally contained organic metal compound (AL2) and electron donor (E2).

The catalyst for main polymerization of olefins comprises the above-mentioned preactivated catalyst, organic metal compound (AL2) and electron donor (E2). The total amount of the organic metal compound (AL1) in the preactivated catalyst and the organic metal compound (AL2) is 0.05 to 3,000 mole, preferably 0.1 to 1,000 mole per 1 mole of the transition metal atom in the preactivated catalyst. The total amount of the electron donor (E1) in the preactivated catalyst and the electron donor (E2) is 0 to 5,000 mole, preferably 0 to 3,000 mole per 1 mole of the transition metal atom in the preactivated catalyst.

If the total amount of the organic metal compounds (AL1) and (AL2) is too small, the reaction rate of the main polymerization of propylene or other olefins is inappropriately slowed down. On the other hand, if the total amount of the organic metal compounds (AL1) and (AL2) is too large, the polymerization reaction rate is not sufficiently increased and is inefficient, and in addition undesirable large amounts of residue of the organic metal compound are contained in the polypropylene composition obtained as a final product. Furthermore, if the total amount of the electron donors (E1) and (E2) is too large, the polymerization reaction rate is greatly reduced.

The same types of compounds as those previously described for the organic metal compound (AL1) and the electron donor (E1) may be used as the organic metal compound (AL2) and the electron donor (E2), respectively, which are added as needed into the catalyst for the main polymerization of olefin. Furthermore, these compounds may be used either alone or in combinations of two or more.

Still furthermore, the organic metal compound (AL2) and the electron donor (E2) may be either of the same types as those used in the preliminary activation treatment or of different types from those used in the preliminary activation treatment.

The catalyst for main polymerization of olefin may be prepared as a combination of a powdery precipitate, or a suspension in which a solvent is added to the powdery precipitate, and an organic metal compound (AL2) and, an electron donor (E2) as needed. The powdery precipitate is formed by removing the solvent, unreacted olefins, the organic metal compound (AL1), the electron donor (E1) and the like from the preactivated catalyst by filtration or decantation. Furthermore, the catalyst for main polymerization of olefin may also be prepared as a combination of another powdery precipitate, or a suspension in which a solvent is added to the powdery precipitate, and an organic metal compound (AL2) and an electron donor (E2) as required. The powdery precipitate in this case is formed by evaporating and removing the solvent and unreacted olefins from the preactivated catalyst by reduced pressure distillation, inert gas flow or the like.

In the method of producing a polypropylene composition according to the present invention for use in polypropylene films, the amount of the preactivated catalyst or the catalyst for main polymerization of olefin for use is 0.001 to 1,000 millimole, preferably 0.005 to 500 millimole per 1 liter of polymerization volume, expressed in terms of the amount of transition metal atom in the preactivated catalyst. By using the transition metal compound catalyst composition within the above-specified range, it is possible to maintain efficient and controlled polymerization reaction rate of propylene or a mixture of propylene and other olefins.

In the method of producing a polypropylene composition for use in polypropylene films according to the present invention, the main polymerization of propylene or a mixture of propylene and other olefins can be performed by a known polymerization process for olefins, such as slurry polymerization, bulk polymerization, gas phase polymerization, solution polymerization, or a combination of two or more types of these processes. In the slurry polymerization, olefin is polymerized in an inert solvent, for example, aliphatic hydrocarbons such as propane, butane, pentane, hexane, heptane, octane, isooctane, decane, dodecane or the like, alicyclic hydrocarbons such as cyclopentane, cyclohexane, methyl cyclohexane or the like, aromatic hydrocarbons such as toluene, xylene, ethylbenzene or the like, gasoline fraction or hydrogenized diesel oil fraction. In the bulk polymerization, the olefin is used as a solvent. In the gas phase polymerization, olefin is polymerized in gas phase. In the solution polymerization, the polyolefin formed by polymerization is in liquid state.

In any polymerization process as described above, the polymerization is performed under conditions of a temperature of 20 to 120° C., preferably 30 to 100° C., more preferably 40 to 100° C., at a pressure of 0.1 to 5 MPa, preferably 0.3 to 5 MPa and approximately for 5 minutes to 24 hours of continuous, semi-continuous or batch polymerization. Under the above-mentioned polymerization conditions, the polypropylene (b) can be produced highly efficiently and with a controlled reaction rate.

In a further preferable embodiment of the method for producing a polypropylene composition of the present invention, the condition of polymerization is chosen so that the polypropylene (b) formed in the main polymerization and the polypropylene composition obtained as a final product can have an intrinsic viscosity [$\eta r$] of 0.2 to 10 dl/g, preferably 0.5 to 8 dl/g, and also so that the amount of the polyethylene (A) derived from the preactivated catalyst contained in the obtained polypropylene composition is 0.001 to 5 wt %. Furthermore, similarly to known olefin polymerization methods, the molecular weight of the formed polymer can be adjusted by the use of hydrogen in the polymerization.

After the main polymerization, known after-treatment processes such as catalyst inactivation treatment, catalyst residue removing treatment, drying and the like are performed as needed, and the intended polypropylene composition having excellent transparency and rigidity is obtained.

In order to obtain powder, after the main polymerization, known after-treatment processes such as catalyst inactivation treatment, catalyst residue removing treatment, drying and the like are performed as needed, and powdery composition comprising polypropylene (a) and (b) can be obtained. The polypropylene composition of the present invention is obtained, for example, by adding polyethylene (c) used in the present invention to the powdery composition, mixing it with a known mixing device, and performing melt mixing as required.

Another method for producing a propylene composition according to the present invention comprises polymerizing olefins in the presence of a catalyst for polyolefin production comprising a transition metal compound catalyst composition containing at least a titanium compound, 0.01 to 1,000 mole of an organic metal compound (AL1) of a metal selected from the group consisting of metals that belong to Group I , Group II, Group XII, and Group XIII of the periodic table published in 1991 per 1 mole of the transition metal atom, and 0 to 500 mole of electron donor (E1) per 1 mole of the transition metal atom to preliminarily activate the catalyst and form 0.001 to 5,000 g of polypropylene having an intrinsic viscosity [$\eta A$] of at least 0.01 dl/g but less than 15 dl/g measured in tetralin at 135° C. per 1 g of the transition metal compound catalyst composition.

The intrinsic viscosity [$\eta A$] of the polypropylene is at least 0.01 dl/g but less than 15 dl/g, preferably 0.05 to 10 dl/g, more preferably 0.1 to 8 dl/g so that a film excellent in transparency can be obtained. If the intrinsic viscosity [$\eta A$] of the polypropylene is far from the above-mentioned range, neck-in is caused and a sweeper roll mark is transferred during production of films, and the productivity and transparency of the film is greatly reduced. Furthermore, if the amount of the formed polypropylene is too small, aggregated and fine powdery polypropylene is formed during the production of polypropylene as described below, and therefore it is inefficient in terms of cost performance.

In the preliminary activation treatment, as long as 0.001 to 5,000 g of polypropylene having an intrinsic viscosity [$\eta A$] of at least 0.01 dl/g but less than 15 dl/g is supported by a preactivated catalyst per 1 g of the transition metal compound catalyst composition, additional preliminary activation using other α-olefins such as propylene, butene, pentene and the like is not restricted and may be performed. In this case, the order of the preliminary activation is not particularly limited.

Then, polypropylene having an intrinsic viscosity [$\eta P$] of at least 0.01 dl/g but less than 15 dl/g measured in tetralin at 135° C. is produced in the presence of a catalyst for the main polymerization of olefin comprising the preactivated catalyst for olefin polymerization, an organic metal compound (AL2) of a metal selected from the group consisting of metals that belong to Group I, Group II, Group XII, and Group XIII of the periodic table published in 1991, and electron donor (E2). The total amount of the organic metal compound (AL1) contained in the preactivated catalyst and the organic metal compound (AL2) is 0.05 to 5,000 mole per 1 mole of the transition metal atom in the preactivated catalyst. The total amount of the electron donor (E1) contained in the preactivated catalyst and the electron donor (E2) is 0 to 3,000 mole per 1 mole of the transition metal atom in the preactivated catalyst. The intrinsic viscosity [ηP] of the polypropylene is at least 0.01 dl/g but less than 15 dl/g, preferably 0.2 to 10 dl/g, more preferably 0.5 to 8 dl/g, so that the productivity in producing a film is improved.

Finally, the polypropylene composition of the present invention can be obtained by mixing 100 weight parts of the polypropylene produced as described above with at least 0.05 but less than 10 weight parts of separately-produced polyethylene, and performing melt mixing with an extruder or the like.

The mixed amount of the polyethylene is at least 0.05 but less than 10 weight parts, preferably at least 0.05 but less than 5 weight parts, more preferably 0.05 to 1 weight parts so that a film excellent in transparency and rigidity can be obtained and a polypropylene composition having good productivity can be produced.

Hereinafter the present invention will be explained in further detail with reference to examples and comparative examples.

Definition of the terms and measurement methods used in the examples and comparative examples are as follows.

(1) Intrinsic viscosity [η]: values of the limiting viscosity in tetralin at 135° C. measured with an Ostwald's viscometer produced by Mitsui Toatsu Chemicals Inc. (unit: dl/g).

(2) Crystallization temperature (Tc): values measured with a Perkin-Elmer, Ltd. Differential Scanning Calorimetry VII of the temperature indicating the maximum value of the heat absorption at the crystallization of a polypropylene composition while raising the temperature from the room temperature to 230° C. under a temperature rise condition of 30° C./minute, maintaining the same temperature for 10 minutes, lowering the temperature to −20° C. under the condition of −20° C./minute, maintaining the same temperature for 10 minutes, raising the temperature to 230° C. under the temperature rise condition of 20° C./minute, maintaining the same temperature for 10 minutes, lowering the temperature to 150° C. under the condition of −80° C./minute, and further lowering the temperature by −5° C./minute (unit: ° C.).

(3) Melting temperature (PP-T1): values measured with an ADACHI KEIKI Co., Ltd. digital thermometer WO2866 right under a die of a temperature of the molten resin extruded from the die at the same screw speed as the processing of a film produced by a T die method (unit: ° C.).

(4) Chilled roll temperature (PP-T2): values measured with a MINOLTA CO., LTD. non-contact infrared thermometer 505 of a temperature of a chilled roll (cooling roller) surface at the production of a film by a T die method (unit: ° C.).

(5) Film transparency: haze values measured according to ASTM D 1003 for films (unit: %). This is used as an indicator of transparency.

(6) Film rigidity: Young's modulus is measured according to ASTM D 882 and used as an indicator of rigidity.

(7) Melt flow rates (MFR): melt flowability of a resin according to the condition 14 in Table 1 of JIS K7210 (unit: g/10 minutes).

(8) Film spreadability: With regard to axial direction (length direction) and mechanical flow direction (width direction) of a film produced by the inflation technique, the thickness in flow direction was measured with a Dial Gage (product name) at 10 cm intervals, and the thickness in axial direction was measured at 1 m intervals for 50 m. Standard deviation was calculated for each of the obtained thicknesses in axial direction and in flow direction and then evaluated according to the following standard. The smaller the standard deviation, the better the film spreadability.

(Standard of Spreadability)

○: Both of the standard deviations of the thickness in axial direction and flow direction=less than 5%.

×: Either of the standard deviations of the thickness in axial direction or flow direction=5% or more.

(9) Impact resistance of a film: punching impact strength measured according to ASTM D 781.

(10) Neck-in length: values measured with a metallic scale of the gap between the length of T die opening and the length of the obtained film in the axial direction (unit: mm). The smaller the value of the neck-in length, the smaller degree of the neck-in phenomenon occurred, so that the width of the film product having uniform thickness becomes large. In order to determine the effect of the polypropylene composition, the width of the lip opening of the T die was set to be constant (1.0 mm).

(11) Productivity: Productivity is ranked in accordance with spreadability, neck-in length, and in addition the standard of appearance as mentioned below including irregular transparency in the film product (variation of haze value (Haze: ASTM D 1003) by 2% or more). Particularly when irregular transparency is caused due to formation of sweeper roll mark, haze value varies by 3% or more, and the standard of irregular transparency serves as the standard of formation of transferred sweeper roll mark.

(12) Standard of appearance

○: no irregular transparency, wrinkling, unmolten materials and transferred sweeper roll mark have been produced.

×: at least one of irregular transparency, wrinkling, unmolten materials and transferred sweeper roll mark has been produced.

(13) Productivity was evaluated according to the ranking in the following.

| Productivity rank | Spreadability | Neck-in length(mm) | Appearance |
| --- | --- | --- | --- |
| 7 | ○ | less than 40 | ○ |
| 6 | ○ | at least 40 but less than 100 | ○ |
| 5 | ○ | 100 or more | ○ |
| 4 | ○ | less than 40 | X |
| 3 | ○ | 40 or more | X |
| 2 | X | less than 40 | X |
| 1 | X | 40 or more | X |

A film of the rank not less than 6, preferably 7, has a high productivity.

EXAMPLE 1

(1) Preparation of a Transition Metal Compound Catalyst Composition.

In a stainless steel polymerization reactor with an agitator, 0.3 liter of decane, 48 g of magnesium chloride anhydride, 170 g of orthotitanate-n-butyl and 195 g of 2-ethyl-1-hexanol were mixed together, then dissolved while stirring at 130° C. for one hour to have a uniform solution. The uniform solution was heated to 70° C., then 18 g of di-i-butyl phthalate was added thereto while stirring. One hour later, 520 g of silicon tetrachloride was added over a 2.5 hour period to form a solid precipitate and further maintained at 70° C. for one hour. The solid was separated from the solution and washed with hexane to obtain a solid product.

All the solid product was mixed with 1.5 liters of titanium tetrachloride dissolved in 1.5 liters of 1,2-dichloroethane. Then, 36 g of di-i-butyl phthalate was added thereto and the mixture was allowed to react for two hours at 100° C. while stirring. Then, the liquid phase portion was eliminated by decantation at the same temperature, and 1.5 liters of 1,2-dichloroethane and 1.5 liters of titanium tetrachloride were added and maintained at 100° C. for two hours while kneading. Then by washing with hexane and drying, a supported titanium containing catalyst composition (transition metal compound catalyst composition) containing 2.8 weight % of titanium was obtained.

(2) Preparation of Preactivated Catalyst.

After replacing air in a 5 liter capacity stainless steel polymerization reactor having an inclined-turbine agitator by a nitrogen gas, 2.8 liters of n-hexane, 4 millimole of triethyl aluminum (organic metal compound (AL1)) and 9.0 g of the supported titanium containing catalyst composition prepared as mentioned above (5.26 millimole in terms of Ti atom) were added into the polymerization reactor. Then ethylene was continuously supplied into the reactor for two hours while maintaining the temperature at 20° C. and the pressure at 0.59 MPa in the reactor to carry out preliminary activating polymerization.

Separately, polymer formed in a preliminary polymerization performed with the same conditions was analyzed and it was found that 2.0 g of polymer was formed per 1 g of the supported titanium containing catalyst composition, and the intrinsic viscosity [$\eta$T2] of the polymer measured in tetralin at 135° C. was 6 dl/g.

After the reaction period, unreacted ethylene was discharged outside the reactor. Then, the gas phase portion in the polymerization reactor was replaced by a nitrogen gas one time to prepare a preactivated catalyst slurry for main polymerization.

(3) Production of Polypropylene and a Polypropylene Composition.

After replacing air in a 500 liter capacity stainless steel polymerization reactor having an agitator by a nitrogen gas, 240 liters of n-hexane, 780 millimole of triethyl aluminum (organic metal compound (AL2)), 78 millimole of diisopropyldimethoxysilane (electron donor (E2)) and ½ amount of the preactivated catalyst slurry obtained as mentioned above were added into the polymerization reactor at 20° C. Then after introducing 55 liters of hydrogen into the polymerization reactor and raising the temperature to 70° C., propylene was continuously supplied for two hours in the polymerization reactor under the condition of a polymerization temperature of 70° C. while maintaining the pressure of the gas phase portion in the reactor at 0.79 MPa, so that main polymerization of propylene was performed.

After the polymerization was complete, 1 liter of methanol was introduced to the polymerization reactor and the catalyst deactivation reaction was conducted at 70° C. for 15 minutes. Then after discharging the unreacted gas, the solvent was separated and polymer was dried to obtain 40.1 kg of polymer having an intrinsic viscosity [$\eta$r] of 1.97 dl/g.

The polypropylene powder remained on 4-mesh at a rate of 0.05%, and the polypropylene powder passed through 70-mesh at a rate of 0.1%.

The polymer as obtained was found out to be a polypropylene composition containing 0.008 weight % of the polyethylene (A) formed by preliminary activating polymerization, which corresponds to the component (a), and the polypropylene (b) had an intrinsic viscosity [$\eta$P] of 1.97 dl/g.

Using a Henschel mixer, 100 weight parts of the polypropylene composition obtained, 0.1 weight parts of Tetrakis-[methylene-3-(3',5'-di-t-butyl-4'-hydroxyphenyl) propionate] methane, 0.1 weight parts of calcium stearate, 0.25 weight parts of silica having an average particle diameter of 1.7 $\mu$m, and 0.10 weight parts of erucin amide were mixed for two minutes. The mixture was pelletized at 230° C. using an extruder having a screw diameter of 65 mm to produce pellets. Various physical properties of the pellets were measured and evaluated to find that MFR and the crystallization temperature to be 4.5 g/10 minutes and 122.5° C., respectively.

The pellets were formed into a non-oriented film with a monolayer T die device having a screw diameter of 110 mm, an opening length of T die of 1 m and lip opening width of 1.0 mm under the conditions of the melt temperature of 250° C., the water temperature passing through the chilled roll of 20° C., the thickness target of 15 $\mu$m, and the taking up rate of 200 m/min. The chilled roll temperature during the film production was at 40° C., and the productivity of the obtained film was "7". The properties of the film and the composition are shown in Table 1.

The pellet as obtained was observed with a transmission electron microscope (TEM). The observation was performed as follows: a sample of the pellet was preheated for three minutes by thermal pressing at a temperature of 200° C., then press-molded at a pressure of 50 kg/cm$^2$ for five minutes, and then solidified by cooling under pressure at a temperature of 50° C. under a pressure of 50 kg/cm$^2$ for three minutes to produce a flat test piece having a thickness of 1 mm. The test piece was trimmed and then electron staining with vapor of $RuO_4$ aqueous solution was performed to provide contrast for TEM observation. The $RuO_4$ aqueous solution was prepared by dissolving 0.6 g of $NaIO_4$ made by Wako Pure Chemical industries, Ltd., guaranteed reagent, and 0.1 g of $RuCl_3 \cdot nH_2O$ made by Wako Pure Chemical industries, Ltd., into 10 ml of pure water. The test piece was put into a sealed container with the $RuO_4$ aqueous solution and allowed to stand at room temperature for 48 hours, so that staining was performed.

Although the staining was carried out with vapor of the aqueous solution in the present invention, it is also possible to perform it in a $RuO_4$ aqueous solution or with a sublimation gas from $RuO_4$ crystal so as to obtain the same effect. The stained sample was processed into a section with an ultramicrotome made by Japan Microtome Ltd., using a diamond knife having a knife angle of 45°, and an ultrathin section having a thickness of about 80 nm was obtained. A sample of the ultrathin section was observed using a TEM of JEM-100CX made by JEOL, Ltd. at an accelerating voltage of 100 kV.

Figure 1:
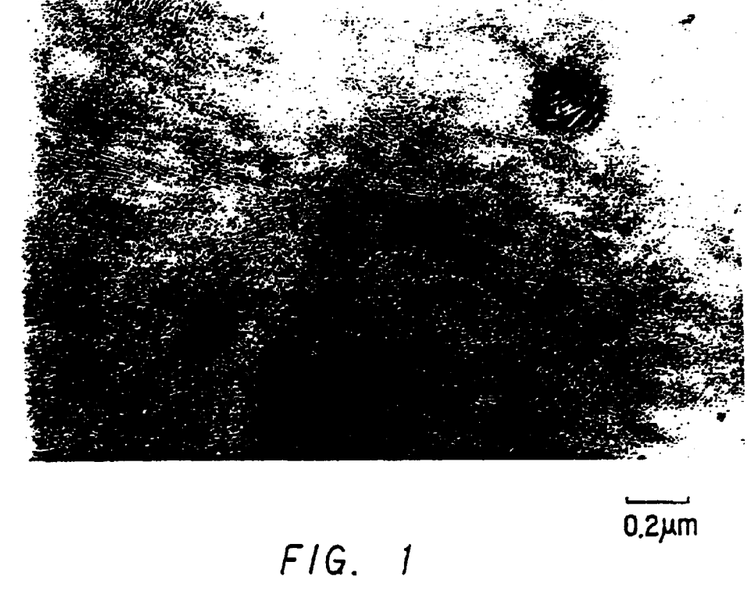
FIG. 1 is a photomicrograph (75,000× magnification) of a polypropylene composition according to Example 1 of the present invention, which is obtained by observation by means of a transmission electron microscope (TEM).

FIG. 1 shows a photomicrograph of 75000× magnification observed with the above-mentioned TEM. As is evident from FIG. 1, the polymer of this example contained a polyethylene as dispersed fine particles having a number average particle diameter of about 70 nm. Furthermore, it was also found out that the polyethylene had a lamellar structure.

Figure 2:
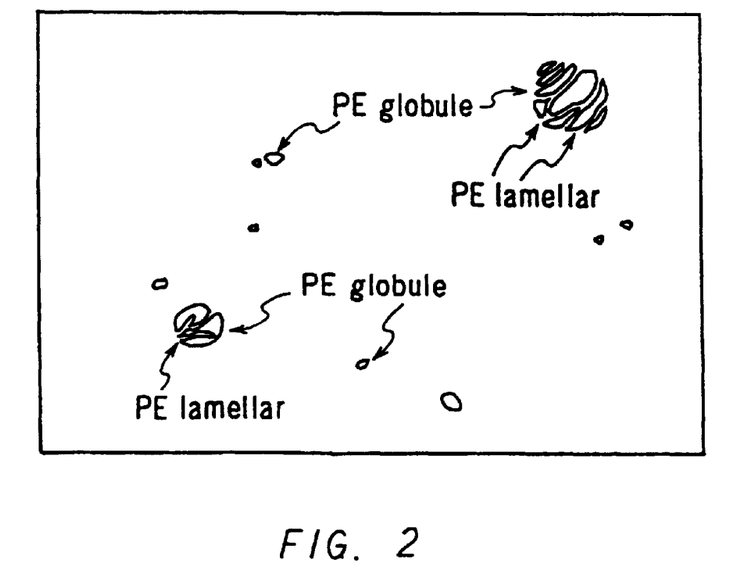
FIG. 2 is a traced diagram with explanation clarifying the photomicrograph of FIG. 1.

FIG. 2 is a traced diagram having an explanation of a photograph in FIG. 1. The explanation relates to globules and lamellar structure of high molecular weight polyethylene. It is considered that the molecules of the polyethylene and the polypropylene interact with each other in some way. This appears to be a reason that a film having excellent rigidity, in which a sweeper roll mark is not transferred and little neck-in is caused during the film production, and having high productivity can be obtained.

EXAMPLE 2

A polypropylene compositions was produced under the same conditions as Example 1 except that the conditions of the preliminary activating polymerization with ethylene were changed so as to change the formation amount of polyethylene (A). The powdery property of the obtained polypropylene composition was as follows: the polypropylene powder remained on 4-mesh at a rate of 0.07%, and the polypropylene powder passed through 70-mesh at a rate of 0.2%.

Separately, polymer formed in preliminary polymerization performed in the same conditions was analyzed and it was found that 1.0 g of polymer was formed per 1 g of the supported titanium containing catalyst composition, and the polymer had an intrinsic viscosity [$\eta T2$] of 13 dl/g measured in tetralin at 135° C.

The polypropylene composition as obtained was processed into pellets as in Example 1 and formed into a film under the same conditions as Example 1. The productivity of the obtained film was "6". The results of the evaluation of the film are shown in Table 1.

COMPARATIVE EXAMPLE 1

A polypropylene composition was produced using the same conditions as Example 1 except that the conditions of the preliminary activating polymerization with ethylene were changed so as to change the intrinsic viscosity of the polyethylene (A) in (2) in Example 1.

Separately, polymer formed in preliminary polymerization performed using the same conditions was analyzed and it was found that 2.0 g of polymer was formed per 1 g of the supported titanium containing catalyst composition, and the polymer had an intrinsic viscosity [$\eta T2$] of 20 dl/g measured in tetralin at 135° C.

The obtained polypropylene composition had an intrinsic viscosity [$\eta r$] of 1.70 dl/g. The powdery property of the polypropylene composition was as follows: the polypropylene powder remained on 4-mesh at a rate of 0.06%, and the polypropylene powder passed through 70-mesh at a rate of 0.2%.

This polypropylene composition was processed into pellets as in Example 1 and formed into a film under the same conditions as Example 1. The obtained film had a productivity of "5". The results of the evaluation of the film are shown in Table 1.

COMPARATIVE EXAMPLE 2

A polypropylene composition was produced using the same conditions as Example 1 except that the preliminary activating polymerization was performed with propylene instead of with ethylene in (2) in Example 1.

Separately, polymer formed in preliminary polymerization performed under the same conditions was analyzed and it was found that 2.0 g of polymer was formed per 1 g of the supported titanium containing catalyst composition, and the polymer had an intrinsic viscosity [$\eta T2$] of 2 dl/g measured in tetralin at 135° C.

The powdery property of the polypropylene composition as obtained was as follows: the polypropylene powder remained on 4-mesh at a rate of 0.01%, and the polypropylene powder passed through 70-mesh at a rate of 0.05%.

The polypropylene composition was processed into pellets as in Example 1 and formed into a film under the same conditions as Example 1. The obtained film had a productivity of "1". The results of the evaluation of the film are shown in Table 1.

COMPARATIVE EXAMPLE 3

A polypropylene composition was produced using the same conditions as Example 1 except that the preliminary activating polymerization with ethylene was not performed in (2) in Example 1.

The polypropylene composition as obtained had an intrinsic viscosity [$\eta r$] of 2 dl/g. The powdery property of the polypropylene composition was as follows: the polypropylene powder remained on 4-mesh at a rate of 0.7%, and the polypropylene powder passed through 70-mesh at a rate of 0.5%. This polypropylene composition was processed into pellets as in Example 1 and formed into a film under the same conditions as Example 1. The obtained film had a productivity of "3". The results of the evaluation of the film are shown in Table 1.

Figure 3:
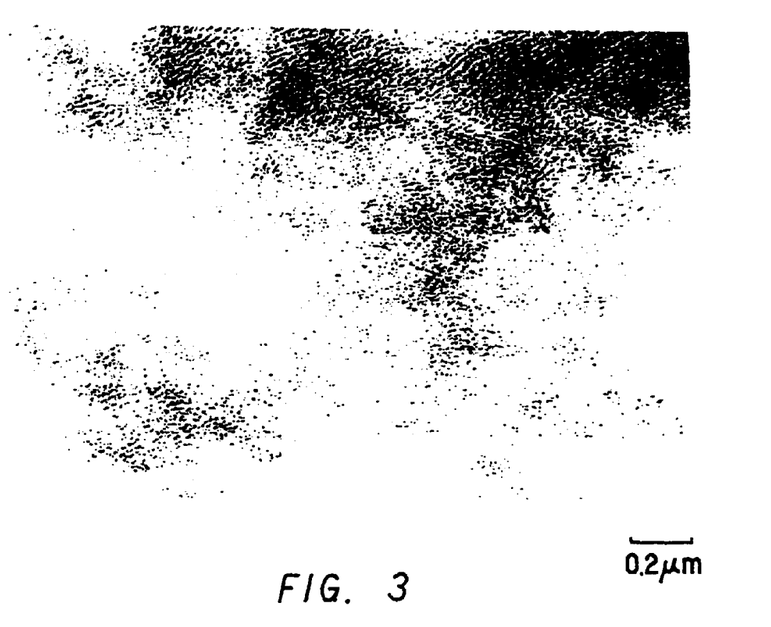
FIG. 3 is a TEM photomicrograph of a conventional polypropylene according to Comparative Example 3.
Figure 4:
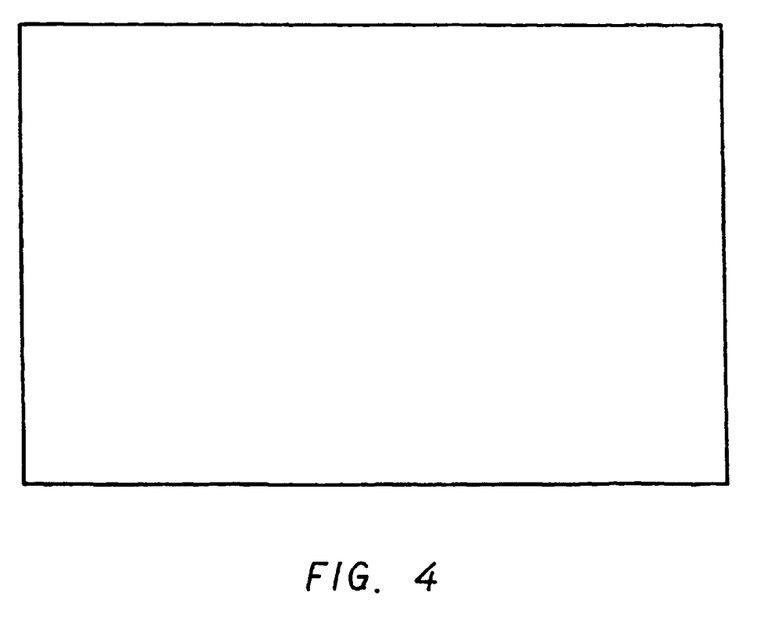
FIG. 4 is a traced diagram explaining the photomicrograph of FIG. 3, which shows that no particles exist in the polypropylene.

The polymer pellets as obtained were observed with a transmission electron microscope (TEM) as in Example 1. As a result, it was found out that a conventionally well-known polypropylene as the Comparative Example 3 does not contain dispersed fine particles as shown in the TEM photograph in FIG. 3 and the traced diagram thereof in FIG. 4.

EXAMPLE 3

A polypropylene composition was produced using the same conditions as Example 1 except that polymerization was performed in (3) as described in the following.

(3) Production of Polypropylene Composition (Main Polymerization of Propylene).

After replacing air in a 500 liter capacity stainless steel polymerization reactor having an agitator by a nitrogen gas, 240 liters of n-hexane, 780 millimole of triethyl aluminum (organic metal compound (AL2)), 78 millimole of diisopropyldimethoxysilane (electron donor (E2)) and ½ of the amount of the preactivated catalyst slurry as previously produced were added into the polymerization reactor at 20° C. Subsequently, 55 liters of hydrogen were supplied to the polymerization reactor and after the temperature was increased to 65° C., propylene-ethylene co-polymerization was carried out while feeding continuously 1.3 kg of ethylene and propylene was continuously supplied for 2 hours, under conditions of a polymerization temperature of 65° C. and maintaining the pressure of the gas phase portion at 0.79 Mpa in the polymerization reactor.

The powdery property of the polypropylene composition as obtained (ethylene content of 2.6%) was as follows: the ethylene-propylene copolymer powder remained on 4-mesh at a rate of 0.3%, and the ethylene-propylene copolymer powder passed through 70-mesh at a rate of 0.01%.

This polypropylene composition was processed into pellets as in Example 1 and formed into a film under the same conditions as Example 1. The results of the evaluation of the film are shown in Table 1. The obtained film had a productivity of "6".

COMPARATIVE EXAMPLE 4

A polypropylene composition was produced using the same conditions as Example 3 except that preliminary activating polymerization was carried out with propylene instead of with ethylene in (2) in Example 3. The powdery property of the polypropylene composition as obtained (ethylene content of 2.0%) was as follows: the ethylene-propylene copolymer powder remained on 4-mesh at a rate of 0.5%, and the ethylene-propylene copolymer powder passed through 70-mesh at a rate of 0.01%.

The polypropylene composition was processed into pellets as in Example 1 and formed into a film under the same conditions as Example 1. The results of the evaluation of the film are shown in Table 1. The obtained film had a productivity of "1".

TABLE 1

| Test items | Examples | | | Comparative Examples | | | |
|---|---|---|---|---|---|---|---|
| | 1 | 2 | 3 | 1 | 2 | 3 | 4 |
| Preliminary Activation polyethylene A | | | | | | | |
| intrinsic viscosity [η] (dl/g) | 6 | 13 | 6 | 20 | — | — | — |
| formation amount (g/g) | 2 | 1 | 2 | 2 | — | — | — |
| polypropylene | | | | | | | |
| intrinsic viscosity [η] (dl/g) | — | — | — | — | 2 | — | — |
| formation amount (g/g) | — | — | — | — | 2 | — | — |
| Polypropylene Composition | | | | | | | |
| intrinsic viscosity [η] (dl/g) | 1.97 | 1.89 | 1.65 | 1.7 | 1.9 | 2 | 1.68 |
| ethylene content (wt %) | 0.008 | 0.004 | 2.6 | 0.006 | — | — | 2.5 |
| MFR | 4.5 | 5.4 | 7 | 3.9 | 5.1 | 4.4 | 7.5 |
| rate of powder remained on 4-mesh (wt %) | 0.05 | 0.07 | 0.3 | 0.06 | 0.01 | 0.1 | 0.8 |
| rate of powder passed through 70-mesh (wt %) | 0.1 | 0.2 | 0.01 | 0.2 | 0.05 | 0.5 | 5 |
| Film Properties | | | | | | | |
| transparency (haze) (%) | 4.4 | 4.6 | 3.8 | 10.5 | 8 | 6 | 5.2 |
| rigidity (Young's modulus) | 960 | 965 | 580 | 990 | 870 | 880 | 520 |
| spreadability | ○ | ○ | ○ | ○ | ○ | ○ | ○ |
| neck-in length (mm) | 38 | 59 | 70 | 110 | 150 | 130 | 180 |
| appearance (IT: irregular transparency) | ○ | ○ | ○ | X (IT) | X (IT) | X (IT) | X (IT) |
| productivity rank | 7 | 6 | 6 | 5 | 1 | 3 | 3 |

EXAMPLES 4 to 6, COMPARATIVE EXAMPLE 5

(1) Preparation of a Transition Metal Compound Catalyst Composition.

In a stainless steel polymerization reactor with an agitator, 0.3 liter of decane, 48 g of magnesium chloride anhydride, 170 g of orthotitanate-n-butyl and 195 g of 2-ethyl-1-hexanol were mixed together, then dissolved by heating at 130° C. for one hour while stirring to provide a uniform solution. The uniform solution was heated to 70° C., and 18 g of di-i-butyl phthalate was added thereto while stirring.

One hour later, 520 g of silicon tetrachloride was added over a 2.5 hour period to form a solid precipitate and further maintained at 70° C. for one hour. The solid was separated from the solution and washed with hexane to obtain a solid product.

All the solid product was mixed with 1.5 liters of titanium tetrachloride dissolved in 1.5 liters of 1,2-dichloroethane. Then, 36 g of di-i-butyl phthalate was added thereto and the mixture was allowed to react for two hours at 100° C. while stirring. Then, the liquid phase portion was eliminated by decantation at the same temperature, and 1.5 liters of 1,2-dichloroethane and 1.5 liters of titanium tetrachloride were added and maintained at 100° C. for two hours while stirring. Then by washing with hexane and drying, a supported titanium containing catalyst composition (transition metal compound catalyst composition) containing 2.8 weight % of titanium was obtained.

(2) Preparation of Preactivated Catalyst.

After replacing air in a 5 liter capacity stainless steel polymerization reactor having an inclined-turbine agitator by a nitrogen gas, 2.8 liters of n-hexane, 4 millimole of triethyl aluminum (organic metal compound (AL1)) and 9.0 g of the supported titanium containing catalyst composition prepared as mentioned above (5.26 millimole in terms of Ti atom) were added into the polymerization reactor. Then, propylene was continuously supplied into the reactor for two hours while maintaining the temperature at 20° C. and a pressure at 0.59 MPa in the reactor to carry out preliminary activating polymerization.

Separately, polymer generated in a preliminary polymerization performed using the same conditions was analyzed and it was found that 2.0 g of polymer was formed per 1 g of the supported titanium containing catalyst composition, and the intrinsic viscosity [ηT2] of the polymer measured in tetralin at 135° C. was 6 dl/g.

After the reaction period, unreacted propylene was discharged from the reactor. Then, the gas phase portion in the polymerization reactor was replaced by a nitrogen gas at one time to prepare a preactivated catalyst slurry for main polymerization.

(3) Production of Polypropylene and a Polyolefin Composition.

After replacing air in a 500 liter capacity stainless steel polymerization reactor having an agitator by a nitrogen gas, 240 liters of n-hexane, 780 millimole of triethyl aluminum (organic metal compound (AL2)), 78 millimole of diisopropyldimethoxysilane (electron donor (E2)) and ½ amount of the preactivated catalyst slurry obtained as mentioned above were added into the polymerization reactor at 20° C. Then after introducing 55 liters of hydrogen into the polymerization reactor and raising the temperature to 70° C., propylene was continuously supplied for two hours in the polymerization reactor under the condition of the polymerization temperature of 70° C. while maintaining the pressure of the gas phase portion in the reactor at 0.79 MPa, so that main polymerization of propylene was performed.

After the polymerization was complete, 1 liter of methanol was introduced to the polymerization reactor and the catalyst deactivation reaction was conducted at 70° C. for 15 minutes. Then after discharging the unreacted gas, the solvent was separated and polymer was dried to obtain 40.1 kg of polymer having an intrinsic viscosity [ηr] of 1.97 dl/g. The polypropylene powder remained on 4-mesh at a rate of 0.05%, and the polypropylene powder passed through 70-mesh at a rate of 0.1%.

(4) Mixing of Polyethylene (c).

Pellets of polyethylene having a density of 0.956 g/cm³ and melt flow rate (190° C.: 21.18 n) of 18 g/10 min were added to the polypropylene powder as obtained in such an amount that a composition with a ratio as shown in Table 2 can be obtained. Further, 0.1 weight % of tetrakis-[methylene-3-(3',5'-di-t-butyl-4'-hydroxyphenyl) propionate] methane, 0.1 weight % of calcium stearate, 0.25 weight % of silica having an average particle diameter of 1.7 μm, and 0.10 weight % of erucic amide were admixed with the composition in this proportion, and mixed together with a Henschel mixer for two minutes. The mixture was granulated with an extruder having a screw diameter of 65 mm at 230° C. to produce pellets.

The pellets were formed into a non-oriented film with a monolayer T die device having a screw diameter of 110 mm, a T die opening length of 1 m and lip opening width of 1.0 mm, under the conditions of the melt temperature of 250° C., the water temperature passing through the chilled roll of 20° C., the thickness target of 25 μm, and the taking up rate of 200 m/min. The chilled roll temperature during the film production was at 40° C. The properties of the obtained films and the respective compositions are shown in Table 2.

TABLE 2

| Test items | Examples | | | Comparative Example |
|---|---|---|---|---|
| | 4 | 5 | 6 | 5 |
| Preliminary Activation polypropylene (a) | | | | |
| intrinsic viscosity [η] (dl/g) | 6 | 6 | 6 | 6 |
| ratio in composition (Note 1) | 0.00796 | 0.00736 | 0.007992 | 0.08 |
| polypropylene (b) | | | | |
| intrinsic viscosity [η] (dl/g) | 1.97 | 1.97 | 1.97 | 1.97 |
| ratio in composition (Note 1) | 99.49204 | 91.99264 | 99.892008 | 99.992 |
| Properties of polypropylene composition (a + b) | | | | |
| powder remained on 4-mesh (wt %) | 0.05 | 0.05 | 0.05 | 0.05 |
| powder passed through 70-mesh (wt %) | 0.1 | 0.1 | 0.1 | 0.1 |
| polyethylene (c) | | | | |
| density (g/cm³) | 0.956 | 0.956 | 0.956 | — |
| ratio in composition (Note 1) | 0.5 | 8 | 0.1 | — |
| Property of polyolefin composition (a + b + c) MFR | 8 | 8.5 | 8 | 8 |
| Properties of film | | | | |
| transparency (haze) (%) | 2.8 | 2.76 | 2.9 | 3.3 |
| rigidity (Young's modulus) | 900 | 1150 | 880 | 770 |
| punching impact strength (J) | 0.5 | 0.4 | 0.9 | 1.2 |
| productivity rank | 7 | 7 | 7 | 2 |

Note 1: ratio in composition comprising polyolefin (a + b + c) (wt %)

Figure 5:
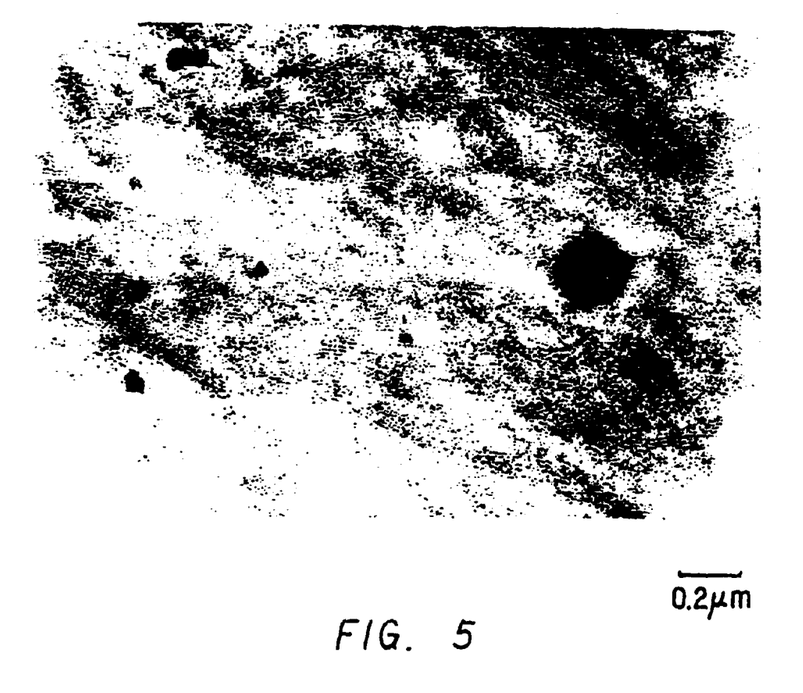
FIG. 5 is a photomicrograph (75,000× magnification) of a polypropylene composition according to Example 4 of the present invention, which is obtained by observation by means of a transmission electron microscope (TEM).
Figure 6:
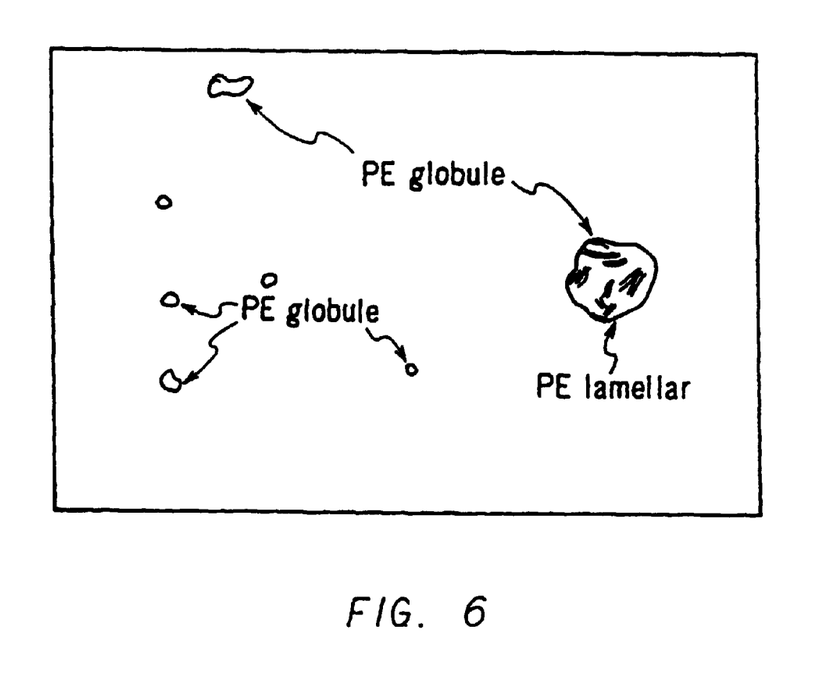
FIG. 6 is a traced diagram with explanation clarifying the photomicrograph of FIG. 5.

Furthermore, the polymer pellet obtained in Example 4 was observed with a transmission electron microscope (TEM) as in Example 1. FIG. 5 shows a photomicrograph of 75000× magnification observed with the above-mentioned TEM. As is evident from FIG. 5, the polymer of this example contained a polyethylene as dispersed fine particles having a number average particle diameter of about 10 to 70 nm. Furthermore, it was also found out that the polyethylene had a lamellar structure. FIG. 6 is a traced diagram having an explanation of a photograph in FIG. 5. The explanation relates to globules and lamellar structure of high molecular weight polyethylene. It is considered that the molecules of the polyethylene and the polypropylene interact with each other in some way. This appears to be a reason that a film having excellent rigidity, in which a sweeper roll mark is not transferred and little neck-in is caused during the film production, and having high productivity can be obtained.

Industrial Applicability

As described above, the present invention provides a polypropylene composition from which a film excellent in transparency and rigidity and having high productivity, in which a sweeper roll mark is not formed and little neck-in is hardly caused during the production of the film, can be obtained.

What is claimed is:

1. A method for producing a polypropylene composition comprising polymerizing 100 weight parts of olefin comprising at least propylene in the presence of 0.001 to 10 weight parts of a preactivated catalyst comprising:
   a catalyst for polyolefin production comprising a supported titanium-containing catalytic composition comprising a magnesium compound supporting titanium tetrachloride, 0.01 to 1,000 mole of an organic metal compound (AL1) of a metal selected from the group consisting of metals that belong to group I, group II, group XII and group XIII of the periodic table published in 1991 per 1 mole of the transition metal atom, and 0 to 500 mole of an electron donor (El) per 1 mole of the transition metal atom; and
   0.01 to 5,000 g of polyethylene (A) having an intrinsic viscosity of at least 0.01 dl/g but less than 15 dl/g measured in tetralin at 135° C. per 1 g of the transition metal compound catalyst composition;
   wherein the olefin comprising at least propylene to be polymerized in the presence of the preactivated catalyst is propylene or a mixture of propylene and other olefin, and a resultant polymer thereby is either a propylene homopolymer or a propylene-olefin random copolymer containing 50 wt % or more of propylene polymerization unit, and wherein the intrinsic viscosity of the polypropylene composition measured in tetralin at 135° C. is 0.2 to 15 dl/g and the polyethylene is finely dispersed as particles in the polypropylene composition.

2. A method for producing a polypropylene composition as claimed in claim 1, wherein the polyethylene is finely dispersed as particles having a number average particle diameter of 1 to 5,000 nm.

3. A method for producing a polypropylene composition as claimed in claim 2, wherein the number average particle diameter of the polyethylene is 10 to 500 nm.

4. A method for producing a polypropylene composition as claimed in claim 1, wherein the olefin comprising at least propylene to be polymerized in the presence of the preactivated catalyst is propylene or a mixture of propylene and ethylene.

5. A method for producing a polypropylene composition as claimed in claim 1, wherein the density of the polyethylene is 0.93 to 0.960 g/cm³.

6. A method for producing a polypropylene composition as claimed in claim 1, the polyethylene (A) being polymerized at a temperature between −20° C. and 30° C.

7. A method for producing a polypropylene composition as claimed in claim 1, the polyethylene (A) being polymerized at a temperature between 0° C. and 20° C.

8. A method for producing a polyolefin composition comprising producing polypropylene having an intrinsic viscosity of at least 0.2 dl/g but less than 15 dl/g measured in tetralin at 135° C. in the presence of a catalyst for main olefin polymerization comprising:

a preactivated catalyst for olefin polymerization obtained by a process comprising polymerizing ethylene in the presence of a catalyst for polyolefin production comprising a supported titanium-containing catalytic composition comprising a magnesium compound supporting titanium tetrachloride, 0.01 to 1,000 mole of an organic metal compound (AL1) of a metal selected from the group consisting of metals that belong to group I, group II, group XII and group XIII of the periodic table published in 1991 per 1 mole of the transition metal atom, and 0 to 500 mole of an electron donor (El) per 1 mole of the transition metal atom to preliminarily activate the catalyst and forming 0.001 to 5,000 g of polyethylene (A) having an intrinsic viscosity of at least 0.01 dl/g but less than 15 dl/g measured in tetralin at 135° C. per 1 g of the transition metal compound catalyst composition, wherein the polyethylene (A) is supported by the transition metal compound catalyst composition;

an organic metal compound (AL2) of a metal selected from the group consisting of metals that belong to group I, group II, group XII and group XIII of the periodic table published in 1991, the total amount of the organic metal compound (AL2) combined with the organic metal compound (AL1) contained in the preactivated catalyst being 0.05 to 5,000 mole per 1 mole of the transition metal atom in the preactivated catalyst; and an electron donor (E2), the total amount of the electron donor (E2) combined with the electron donor (E1) contained in the preactivated catalyst being 0 to 3,000 mole per 1 mole of the transition metal atom in the preactivated catalyst, wherein the olefin is propylene or a mixture of propylene and other olefin, and a resultant polymer thereby is either a propylene homopolymer or a propylene-olefin random copolymer containing 50 wt % or more of propylene polymerization unit.

* * * * *